US012234951B2

(12) United States Patent
Leblanc

(10) Patent No.: US 12,234,951 B2

(45) Date of Patent: Feb. 25, 2025

(54) LEG COVER FOR A CYLINDRICAL TANK

(71) Applicant: DITECH TANK HOLDING COMPANY, INC., Saint John (CA)

(72) Inventor: Daniel Leblanc, Scoudouc (CA)

(73) Assignee: DITECH TANK HOLDING COMPANY, INC., Saint John (CA)

( * ) Notice: Subject to any disclaimer, the term of this patent is extended or adjusted under 35 U.S.C. 154(b) by 139 days.

(21) Appl. No.: 17/858,144

(22) Filed: Jul. 6, 2022

(65) Prior Publication Data

US 2023/0332749 A1 Oct. 19, 2023

(30) Foreign Application Priority Data

Apr. 13, 2022 (CA) ................................ CA 3155296

(51) Int. Cl.
*F17C 13/12* (2006.01)

(52) U.S. Cl.
CPC ...... *F17C 13/12* (2013.01); *F17C 2205/0103* (2013.01)

(58) Field of Classification Search
CPC ...... F17C 13/12; F17C 13/123; F17C 13/126; F17C 2205/0103
See application file for complete search history.

(56) References Cited

U.S. PATENT DOCUMENTS 1,631,619 A * 6/1927 Buvinger ................ F04B 49/06 137/565.17
2,313,823 A * 3/1943 Harrigan ............ A63B 37/0001 248/363
3,387,811 A * 6/1968 Adams, Jr. ................ B63C 9/22 114/365
3,391,730 A * 7/1968 Calhoun, Jr. ............. F25D 3/00 165/47
3,753,407 A * 8/1973 Tilseth ................... B65D 19/44 410/97
4,442,991 A * 4/1984 Levens ................. F17C 13/084 108/55.3
4,690,295 A * 9/1987 Wills ........................ F17C 1/16 220/203.08
4,832,398 A * 5/1989 Tecca .................... F17C 13/084 294/169
5,607,384 A * 3/1997 Caparros ................... F17C 1/00 588/259
6,079,580 A * 6/2000 Garton ................. B65D 88/128 220/675

(Continued)

*Primary Examiner* — Nkeisha Smith

(74) *Attorney, Agent, or Firm* — C. Brandon Browning; Maynard Nexsen PC

(57) ABSTRACT

A leg cover for stacking cylindrical tanks includes: a body for fitting over and accommodating a pair of legs supporting one of the cylindrical tanks, the body having a base with two opposing planar ground contact surfaces capable of contact with a ground surface on which the cylindrical tank rests when the cover is in use and two opposing curved surfaces disposed inwardly from each of the ground contact surfaces thereof, the two opposing curved surfaces each having curvatures for conforming with the curvature of a top surface of another of the cylindrical tanks. A leg cover has planar ground contact surfaces and includes a plurality of cavities formed in a base of the cover so that a series of grooves are formed in the ground contact surfaces, thereby providing traction to the contact surfaces.

15 Claims, 5 Drawing Sheets

(56) References Cited

U.S. PATENT DOCUMENTS

| | | | | | |
|---|---|---|---|---|---|
| 6,142,440 | A * | 11/2000 | Gratz | B65D 85/66 108/51.11 |
| 6,189,720 | B1 * | 2/2001 | Gillispie | B67D 3/0029 141/311 A |
| 6,550,741 | B1 * | 4/2003 | Cottone | B61D 45/003 108/51.11 |
| 6,684,899 | B2 * | 2/2004 | Caparros | F17C 13/12 137/259 |
| 7,331,553 | B2 * | 2/2008 | Kling | A62B 25/00 410/47 |
| 7,350,665 | B2 * | 4/2008 | Hembert | F17C 13/123 220/592 |
| 7,434,777 | B2 * | 10/2008 | Swannell | B65D 85/66 248/346.02 |
| 7,918,429 | B1 | 4/2011 | Kleespie | |
| 8,757,423 | B2 * | 6/2014 | Kleber | F16J 12/00 220/582 |
| 8,985,529 | B2 * | 3/2015 | Masters | B63B 25/08 248/176.1 |
| 9,448,584 | B2 * | 9/2016 | Wu | G06F 1/1654 |
| 9,487,328 | B2 * | 11/2016 | Edwards | B65D 85/66 |
| 10,947,752 | B2 * | 3/2021 | Waclawiak | E04H 12/34 |
| 11,034,509 | B2 * | 6/2021 | Wagh | B65H 49/38 |
| 11,046,481 | B2 * | 6/2021 | Siegl | B65D 83/38 |
| 11,193,477 | B2 * | 12/2021 | Asai | F04B 35/04 |
| 2004/0026437 | A1 * | 2/2004 | Hembert | F17C 13/123 220/630 |
| 2005/0286985 | A1 | 12/2005 | Anthony et al. | |
| 2010/0269919 | A1 * | 10/2010 | Stopka | F04B 35/06 137/376 |
| 2015/0034787 | A1 * | 2/2015 | Ramini | B60T 3/00 248/346.05 |
| 2022/0260215 | A1 * | 8/2022 | Schmick | D21J 7/00 |

* cited by examiner

LEG COVER FOR A CYLINDRICAL TANK

CROSS-REFERENCE TO RELATED APPLICATIONS

The present application claims priority from Canadian patent application No. 3,155,296 filed on Apr. 13, 2022, which is incorporated herein by reference in its entirety.

TECHNICAL FIELD

The present disclosure relates to a leg cover for supporting a cylindrical tank, such as a horizontal tank for storing propane.

BACKGROUND

Horizontal tanks of the type used for storing propane or other gases typically have legs positioned at opposing ends for supporting the tank above the ground. The legs are made of metal, such as steel, but are still prone to corrosion or other water damage in environments with high levels of precipitation or moisture. Further, the contact surface area between the legs and the ground upon which the tank is supported may not provide sufficient support for the tank. As a result, the tank may become unstable, particularly if the ground is uneven or has poor drainage.

In addition, cylindrical storage tanks can be difficult to transport efficiently. Typical tank legs may not be adequate to support a tank while being transported. Transporting multiple tanks is also challenging as the tanks are not easily stacked. This presents obvious problems since the contents of the tanks are often pressurized and combustible.

U.S. Pat. No. 7,918,429 describes a horizontal fuel tank support system for supporting a propane tank above the ground. The legs of the tank fit into receiving portions of the tank support and the support has interlocking ribs to distribute the weight placed on the platform. A base plate forms the bottom of the support. However, the base plate encloses an internal space within the platform that may not facilitate adequate drainage of water. In addition, the problems inherent with the stable transportation of multiple cylindrical tanks is not addressed.

U.S. Application Publication No. 2005/0286985 describes a support system for cylindrical tanks having opposed feet with curved sides to conform to the curved exterior of a tank to secure it in place during transport. However, the efficient transport of multiple tanks is not addressed. In addition, the support system is used on a tank without legs.

There is thus a need in the art for a device for supporting a horizontal tank of the type that is fabricated with legs and that provides for the transport of multiple tanks in a stable manner. The present disclosure seeks to address these problems or provide useful alternatives to known tank support systems.

SUMMARY

According to one aspect of the disclosure, there is provided a leg cover for stacking cylindrical tanks comprising: a body for fitting over and accommodating a pair of legs supporting one of the cylindrical tanks, the body having a base with two opposing planar ground contact surfaces capable of contact with a ground surface on which the cylindrical tank rests when the cover is in use and two opposing curved surfaces disposed inwardly from each of the ground contact surfaces thereof, the two opposing curved surfaces each having curvatures for conforming with the curvature of a top surface of another of the cylindrical tanks.

According to one embodiment, the base of the body comprises a plurality of cavities formed at least in the two opposing planar ground contact surfaces, and wherein one or more of the cavities have drainage holes for drainage of liquid from one or more of the cavities.

According to a further embodiment, the leg cover comprises drainage holes formed on the two opposing curved surfaces.

In another embodiment, a side of the body opposite the base for contacting a bottom surface of one of the cylindrical tanks comprises one or more recesses, which recesses form vented areas that allow for airflow between the bottom surface of one of the cylindrical tanks and the body of the cover.

In another embodiment, the body comprises an intermediate region disposed between the two opposing curved surfaces, the intermediate region being sized to provide clearance for the one of the cylindrical tanks when the tanks are stacked vertically. The intermediate region may be sized to accommodate a lug disposed on a top surface of one of the tanks, the lug used as a guide while stacking the cylindrical tanks. In another embodiment, a recess is formed in the intermediate region to accommodate the lug.

In another embodiment, the base comprises holes for accommodating fasteners to secure the leg cover to a respective leg of the first tank when in use.

In a further embodiment, the holes are for accommodating bolts that secure the body of the cover to the legs.

In another embodiment, the intermediate region is sized to allow space between the cylindrical tanks when the tank leg cover is in use to accommodate fittings on a top surface of one of the cylindrical tanks.

In another embodiment, the tank leg cover is made of a polymeric material. The polymeric material may be a plastic composite material.

In yet a further aspect, there is provided a leg cover for a cylindrical tank comprising:

- a body for fitting over and accommodating a pair of legs supporting the cylindrical tank,
- the body having two opposing planar ground contact surfaces capable of contact with a ground surface on which the cylindrical tank rests when the cover is in use,
- a base of the body comprising a plurality of cavities formed therein so that a series of grooves are formed in the ground contact surfaces, thereby providing traction to the contact surfaces when the surfaces abut the ground surface; and
- at least a portion of the cavities have drainage holes for drainage of liquid from one or more of the cavities.

In another embodiment, a side of the body opposite the planar ground contact surfaces comprises one or more recesses, which recesses form vented areas that allow for airflow between the bottom surface of the tank and the body of the cover.

In another embodiment, the body comprises an intermediate region disposed between the two opposing planar ground contact surfaces.

In a further embodiment, two opposing curved surfaces are disposed inwardly from the two opposing planar ground contact surfaces.

DETAILED DESCRIPTION

Figure 1:
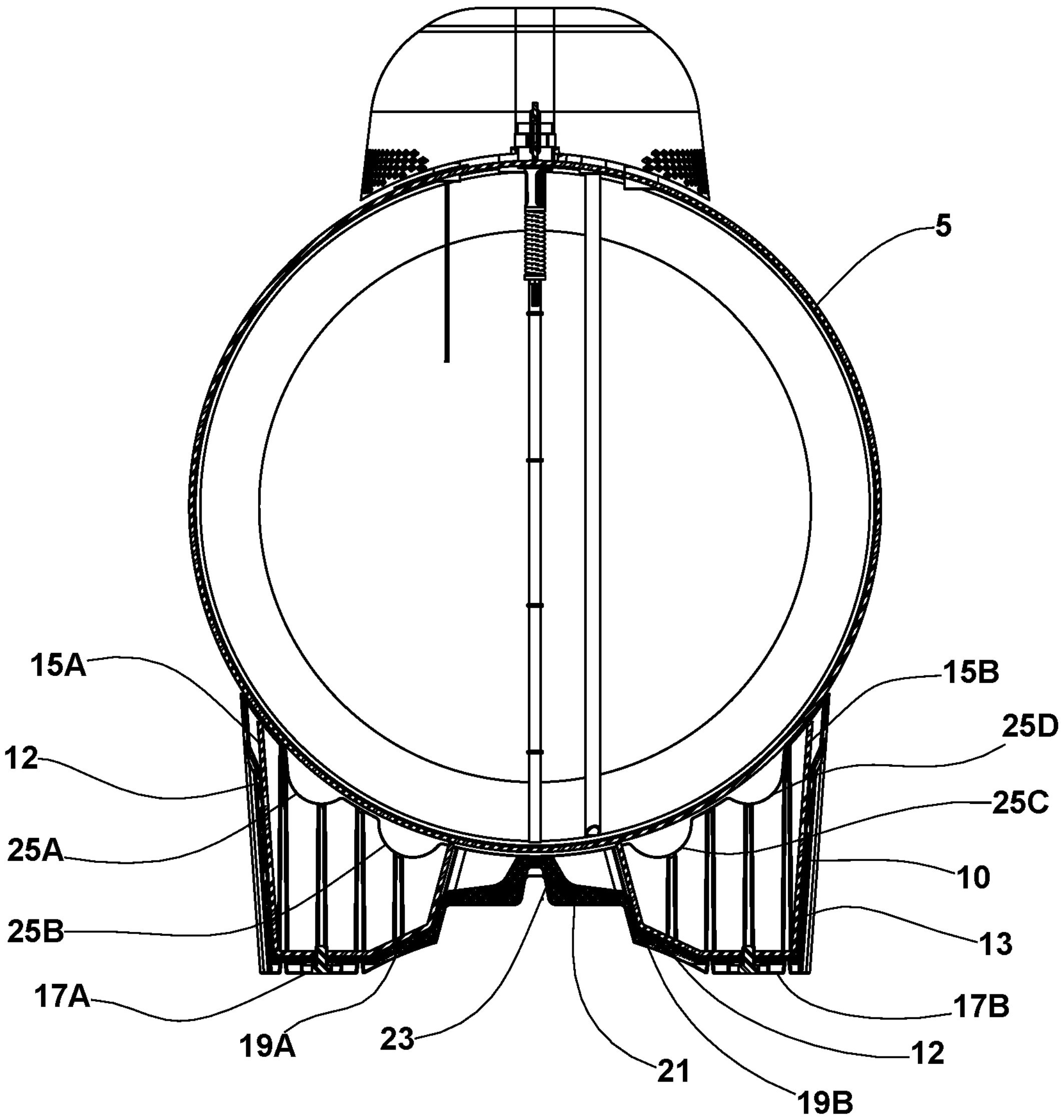
FIG. 1 is a cross-sectional view of a cylindrical tank fitted with a leg cover of one embodiment of the disclosure.

FIG. 1 is a cross-sectional view of a cylindrical tank 5 fitted with a leg cover 10 of one embodiment of the disclosure. The cylindrical tank 5 shown in FIG. 1 is a conventional horizontal tank for storing propane or other combustible gases. The leg cover 10 has a body 12 sized to fit over and accommodate a pair of legs 15A and 15B mounted on the bottom portion of the cylindrical tank 5. The legs 15A and 15B of the cylindrical tank 5 are made of steel and are typically welded onto the bottom of the tank 5 during its manufacture. The leg cover 10 is fastened to the pair of legs 15A and 15B by holes 18A and 18B formed in the base 13 of the leg cover 10 that receive bolts 16A and 16B (see FIG. 2A, FIGS. 2B and 3A).

The base 13 of the body 12 has two opposing planar ground contact surfaces 17A and 17B that contact the ground surface on which the cylindrical tank 5 rests when the cover is in use. The base 13 of the leg cover 10 also has two opposing curved surfaces 19A and 19B disposed inwardly from each of the ground contact surfaces 17A and 17B thereof. The curved surfaces 19A and 19B facilitate vertical stacking with another cylindrical tank as described below. The leg cover 10 also has an intermediate region 21 with a recessed mid-region 23. As further discussed, the intermediate region 21 is sized to provide clearance between two stacked tanks.

The top portion of the leg cover 10 (opposite its base 13) abuts a bottom surface of the cylindrical tank 5 and comprises one or more recesses 25A, 25B, 25C and 25D formed therein. The recesses 25A, 25B, 25C and 25D form vented areas that allow for airflow between the bottom of the cylindrical tank 5 and the top portion of the leg cover 10. Increasing airflow in such a manner reduces water build-up in the leg cover 10 and/or the bottom surface of the tank 5 and thereby reduces corrosion or other water damage on the tank 5.

Figure 2A:
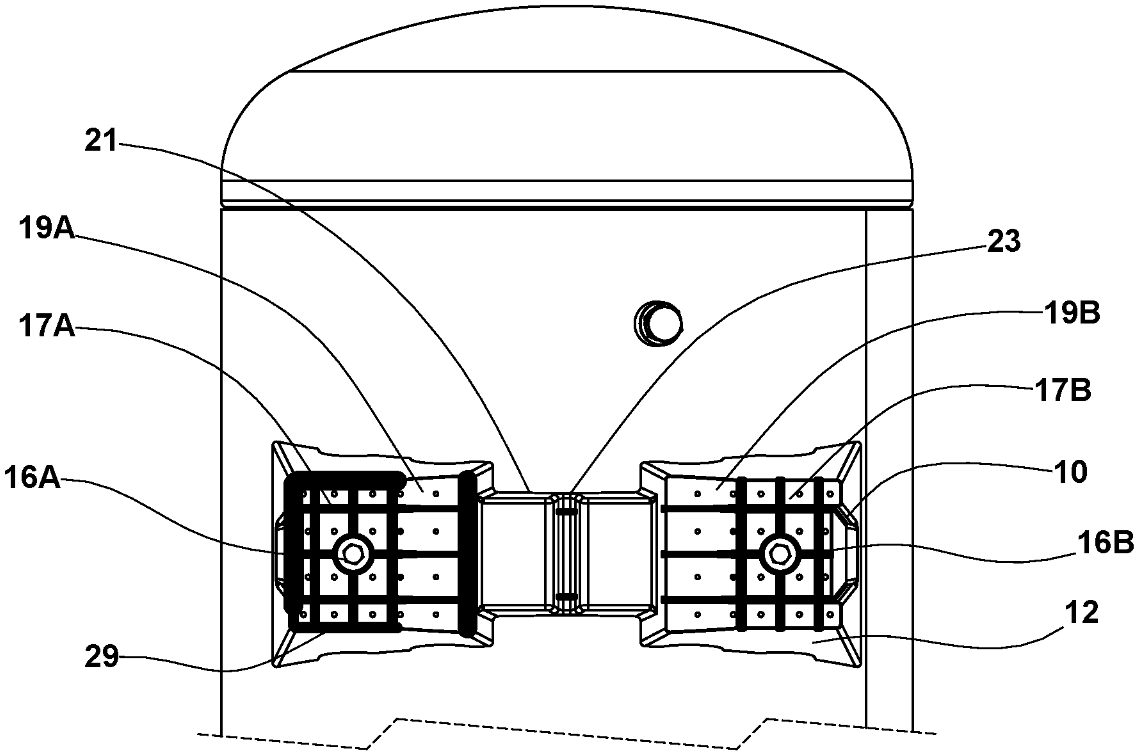
FIG. 2A is a perspective view of the bottom of the cylindrical tank fitted with the leg cover of one embodiment of the disclosure.

FIG. 2A shows the bottom of the cylindrical propane tank 5 with the leg cover 10 mounted thereon with like references numbers depicting the same features as in FIG. 1. FIG. 2A depicts a total contact surface area shown in a dark outline 29 formed by ground contact surface 17A that contact the ground surface on which the cylindrical tank 5 rests and the curved surfaces 19A that contact a tank when stacked.

Figure 2B:
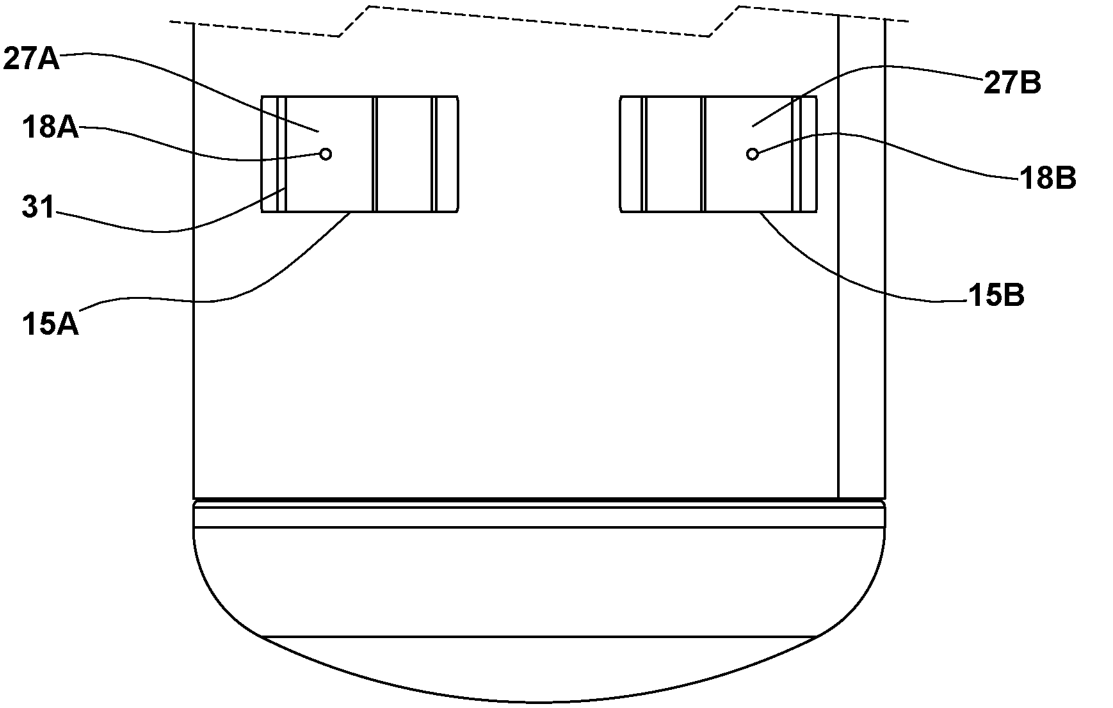
FIG. 2B is a perspective view of the bottom of the cylindrical tank showing the contact area of legs of the tank without the tank cover.

FIG. 2B is shown to illustrate the difference in contact area between the tank leg cover 10 and the legs 15A and 15B without the cover. As shown in FIG. 2B, the contact surface area without the use of the leg cover 10 is confined to the region of the leg 15A that contacts the ground surface, as depicted by a dark outline 31 of contact area 27A. This is in contrast to the outlined region 29 of FIG. 2A in which the contact area includes the ground contact surface 17A and the curved surface 19A. The tank leg cover 10 of the present disclosure has been calculated to have a total ground contact surface+curved contact surface that is 3.6 times more than that of a conventional footing.

Figure 3A:
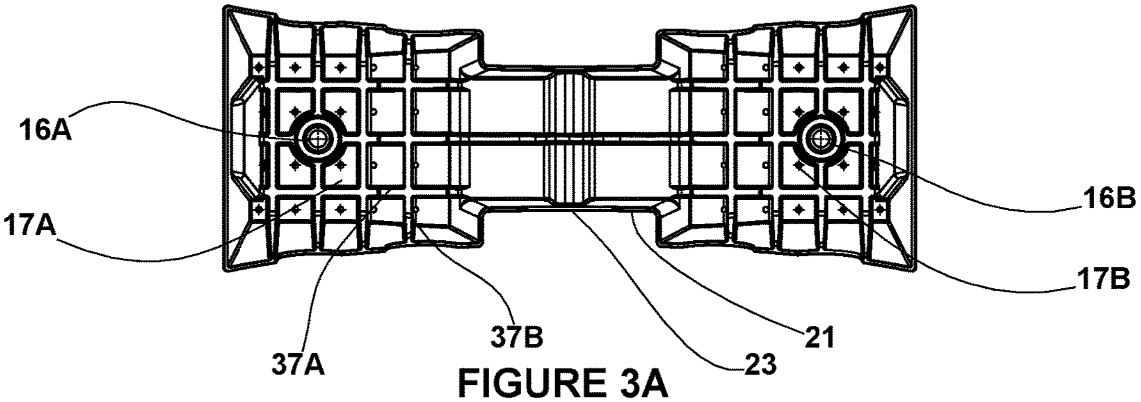
FIG. 3A is a perspective view showing drainage holes in cavities of the base of the leg cover of one embodiment of the disclosure.
Figure 3B:
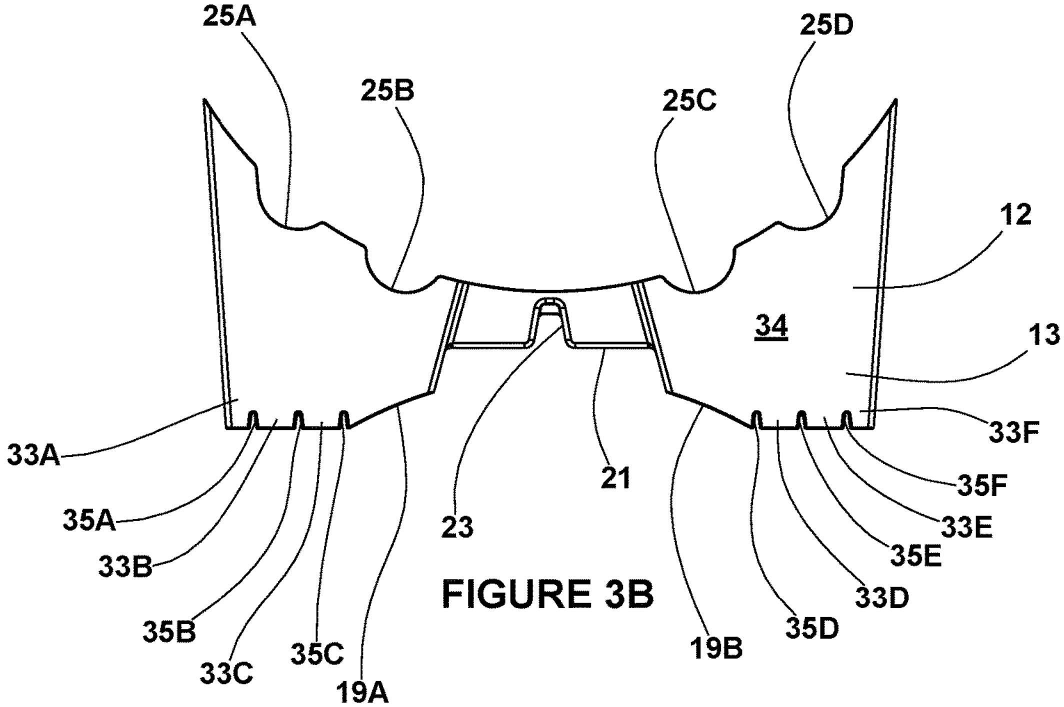
FIG. 3B is a side cross-sectional view of the leg cover of FIG. 3A.
Figure 3C:
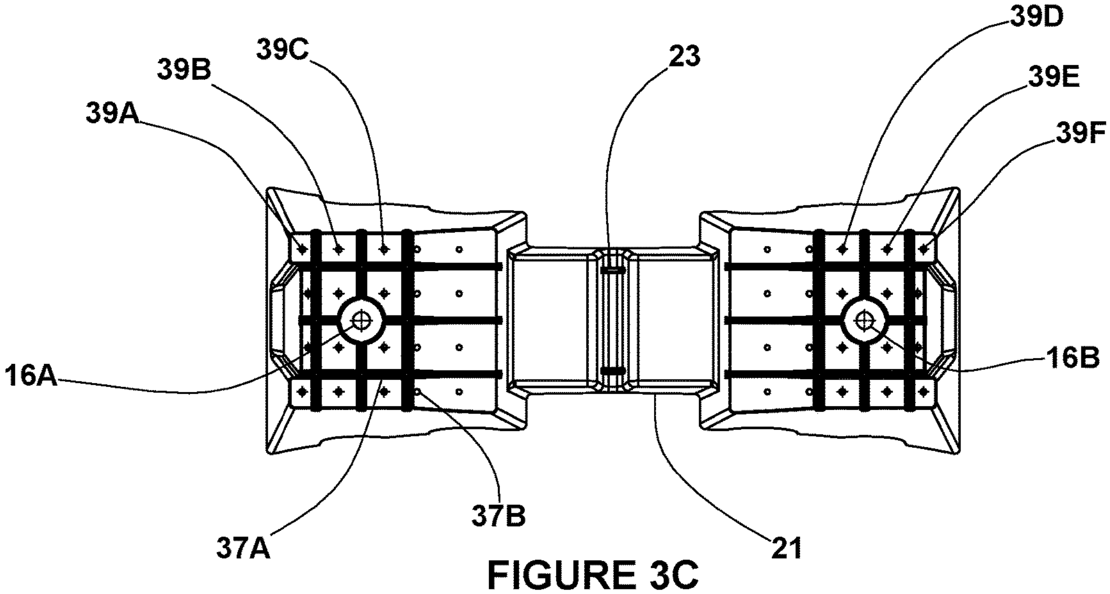
FIG. 3C is a perspective view of the leg cover depicting a traction surface of the base of the leg cover of one embodiment of the disclosure.

FIGS. 3A, 3B and 3C depict the traction, ventilation and water drainage features of the leg cover 10 in more detail. FIG. 3B depicts a series of cavities 33A, 33B, 33C, 33D, 33E and 33F formed in the interior 34 of the base forming the ground contact surfaces 17A and 17B. The cavities 33A, 33B, 33C, 33D, 33E and 33F define corresponding outer grooves 35A, 35B, 35C, 35D and 35E (six cavities and grooves are described for brevity) formed in the ground contact surfaces 17A and 17B. FIG. 3A shows a series of intersecting grooves, two of which are depicted by grooves 37A and 37B. The intersecting grooves form a cross-hatched pattern of grooves that provide a traction surface. To further illustrate, these intersecting grooves are also shown by the dark intersecting lines 37A and 37B in FIG. 3C.

Each cavity 33A, 33B, 33C and 33D depicted in FIG. 3B has corresponding drainage holes form therein (see FIG. 3C). For brevity, six of such holes are shown in FIG. 3C as a plurality of drainage holes 39A, 39B, 39C, 39D, 39E and 39F.

As will be apparent from the foregoing, the cavities form a dual function of providing traction and drainage of water from the interior 34 of the leg cover 10. A further reduction in water build-up is provided by recesses 25A, 25B, 25C and 25D, which (shown in FIG. 3B and FIG. 1) provide a venting function as discussed.

Figure 4A:
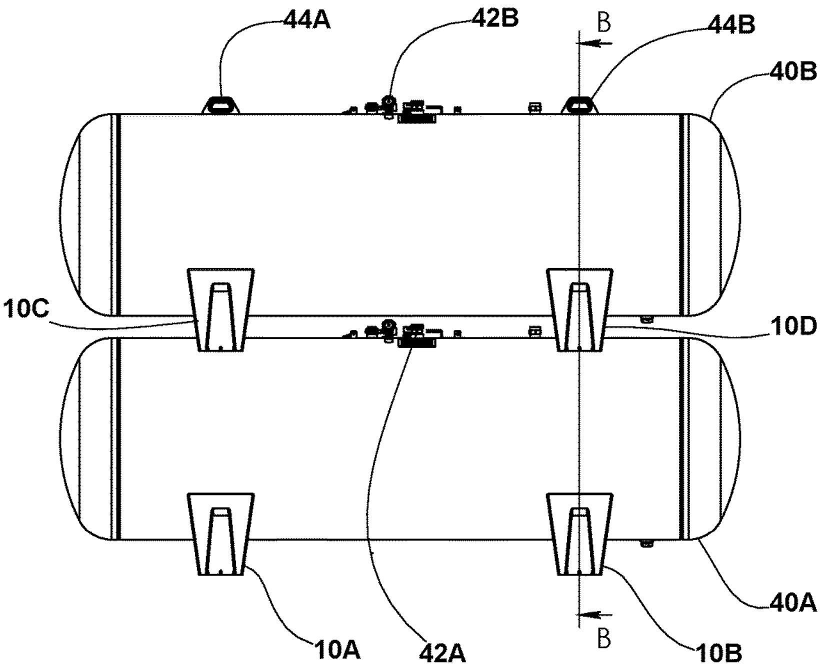
FIG. 4A shows two cylindrical tanks that are vertically stacked using the leg cover of one embodiment.
Figure 4B:
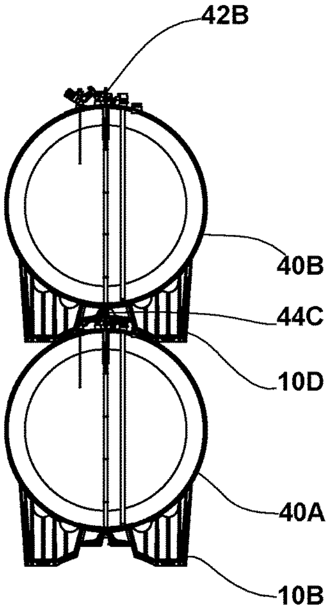
FIG. 4B is a cross-sectional area taken along line B of the two cylindrical tanks of FIG. 4A that are stacked in accordance with one embodiment.

In addition, the leg cover 10 provides for the efficient and stable vertical stacking of multiple tanks for ease of transport or storage. FIGS. 4A and 4B illustrate the unique stacking feature. In one embodiment, the leg cover fits 120 gallon to 2000 gallon horizontal tanks.

FIG. 4A shows two cylindrical tanks 40A and 40B stacked one on top of the other. The first tank 40A (bottom tank) has a first tank leg cover 10A and a second tank leg cover 10B at opposing ends of the tank 40A to support it above the ground. Similarly, the second tank 40B is supported on top of the first tank 40A by a third tank leg cover 10C and a fourth tank leg cover 10D at opposing ends of the second tank 40B. The first 40A and second 40B tanks have respective top-mounted fittings 42A and 42B. In addition, each tank 40A and 40B has a pair of top-mounted lifting lugs 44A and 44B shown on the second tank 40B. (The lifting lugs of tank 40A are obscured from view in FIG. 4A, but a lifting lug 44C on tank 40A can be seen in the cross-section taken along the line B in FIG. 4B and in more detail in FIG. 4C).

Figure 4C:
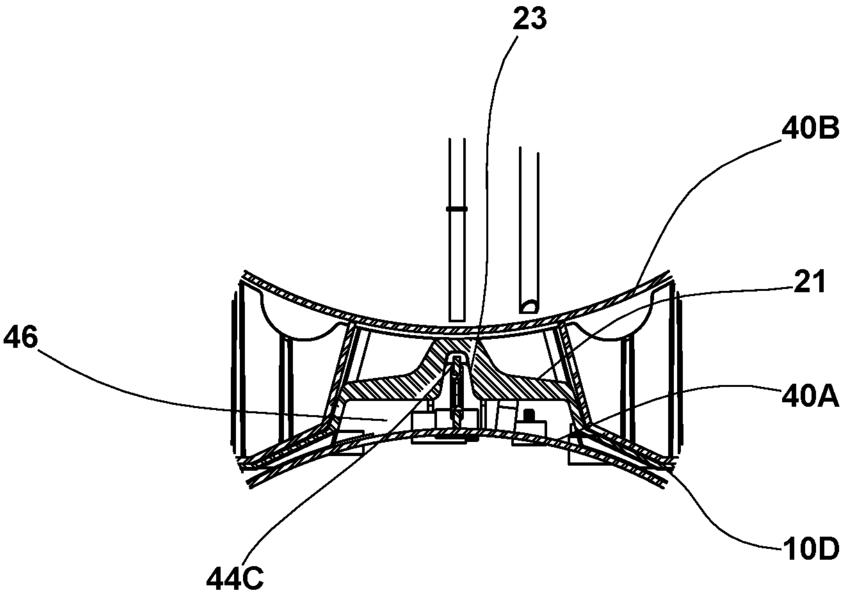
FIG. 4C is a partial cross-sectional area taken along line B of FIG. 4A that shows in more detail a recessed portion formed in the base of the leg cover that accommodates a lifting lug formed on the top of a bottom tank of the two stacked tanks.

FIG. 4C is a partial cross-section taken along line B of FIG. 4A showing the guide and stabilizing function provided by the leg cover 10A and lifting lugs 44A and 44B to enable vertical stacking. As shown, the lifting lug 44C of tank 40A fits into the recess 23 of the intermediate region 21 of the leg cover 10A. In this manner, the lifting lug 44C acts as a guide when the leg cover 10D is placed on the top of tank 40A so that the leg cover 10D is properly positioned on the tank 40A during the stacking process. Furthermore, the lifting lug 44C fits snugly into the recess 23 of the leg cover 10D, thereby providing stability to the vertically stacked tanks.

Moreover, the intermediate region 21 of the leg cover 10D is configured to provide a clearance space 46 (FIG. 4C) between the top of tank 40A on which leg cover 10D rests and the base 13 of the leg cover 10A. This provides sufficient clearance for fittings 42A mounted on the top of tank 40A. This space 46 also provides airflow between the tanks, which is advantageous when the tanks are stored in the stacked arrangement for a period of time in a damp environment.

The above example is merely exemplary and various modifications and substitutions can be made without departing from the scope of the claims as appended herewith.

The invention claimed is:

1. A leg cover for stacking cylindrical tanks comprising:
- a body for fitting over and accommodating a pair of legs supporting one of the cylindrical tanks,
- the body having a base with two opposing planar ground contact surfaces capable of contact with a ground surface on which the cylindrical tank rests when the cover is in use and two opposing curved surfaces disposed inwardly from each of the ground contact surfaces thereof,
- the two opposing curved surfaces each having curvatures for conforming with the curvature of a top surface of another of the cylindrical tanks, and
- the two opposing curved surfaces further comprising at least one cavity and drainage holes formed therein for drainage of liquid from the leg cover.

2. The leg cover of claim 1, wherein the base of the body comprises a plurality of cavities formed at least in the two opposing planar ground contact surfaces, and wherein the plurality of cavities each have one or more drainage holes for drainage of liquid from of the plurality of cavities.

3. The leg cover of claim 1, wherein a side of the body opposite the base for contacting a bottom surface of one of the cylindrical tanks comprises one or more recesses, which recesses form vented areas that allow for airflow between the bottom surface of one of the cylindrical tanks and the body of the cover.

4. The leg cover of claim 1, wherein the body comprises an intermediate region disposed between the two opposing curved surfaces, the intermediate region being sized to provide clearance for the one of the cylindrical tanks when the tanks are stacked vertically.

5. The leg cover of claim 4, wherein the intermediate region is sized to accommodate a lug disposed on a top surface of one of the tanks, the lug used as a guide while stacking the cylindrical tanks.

6. The leg cover of claim 5, wherein a recess is formed in the intermediate region to accommodate the lug.

7. The leg cover of claim 4, wherein the intermediate region is sized to allow space between the cylindrical tanks when the tank leg cover is in use to accommodate fittings on a top surface of one of the cylindrical tanks.

8. The leg cover of any claim 1, wherein the base comprises holes for accommodating fasteners to secure the leg cover to a respective leg of the first tank when in use.

9. The leg cover of claim 8, wherein the holes are for accommodating bolts that secure the body of the cover to the legs.

10. The leg cover of claim 1, wherein the tank leg cover is made of a polymeric material.

11. The leg cover of claim 10, wherein the polymeric material is a plastic composite material.

12. A leg cover for a cylindrical tank comprising:
- a body for fitting over and accommodating a pair of legs supporting the cylindrical tank,
- the body having two opposing planar ground contact surfaces capable of contact with a ground surface on which the cylindrical tank rests when the cover is in use,
- a base of the body comprising a plurality of cavities formed therein so that a series of grooves are formed in the ground contact surfaces, thereby providing traction to the contact surfaces when the surfaces abut the ground surface; and
- at least a portion of the cavities have drainage holes for drainage of liquid from one or more of the cavities.

13. The leg cover of claim 12, wherein a side of the body opposite the planar ground contact surfaces comprises one or more recesses, which recesses form vented areas that allow for airflow between the bottom surface of the tank and the body of the cover.

14. The leg cover of claim 12, wherein the body comprises an intermediate region disposed between the two opposing planar ground contact surfaces.

15. The leg cover of claim 12, wherein two opposing curved surfaces are disposed inwardly from the two opposing planar ground contact surfaces.

* * * * *